United States Patent [19]

Dong et al.

[11] Patent Number: 4,911,768
[45] Date of Patent: Mar. 27, 1990

[54] CO-SUBSTITUTE NI-BASE WEAR RESISTANCE ALLOY FOR HARD SURFACING

[75] Inventors: Zujue Dong, Heilongjiang; Guo-Liang Huang, Shanghai; Shi He, Heilongjiang, all of China

[73] Assignees: Harbin Research Institute of Welding, Heilongjiang; Shanghai Valve Works, Shanghai, both of China

[21] Appl. No.: 195,327

[22] Filed: May 18, 1988

[30] Foreign Application Priority Data

May 19, 1987 [CN] China .................................. 87103599

[51] Int. Cl.[4] ............................................. C22C 19/05
[52] U.S. Cl. .................................... 148/427; 420/442; 420/452; 420/453
[58] Field of Search ....................... 420/442, 452, 453; 148/410, 427

[56] References Cited

U.S. PATENT DOCUMENTS 4,404,049 9/1983 Tanaka et al. ...................... 148/427
4,515,869 5/1985 Bose et al. ........................... 428/680

FOREIGN PATENT DOCUMENTS 55-31127 3/1980 Japan .
57-164950 10/1982 Japan .

Primary Examiner—R. Dean
Attorney, Agent, or Firm—Armstrong, Nikaido, Marmelstein, Kubovcik & Murray

[57] ABSTRACT

This material is kind of wear-resistant Nickel-base alloy for hard surfacing which can be substituted for Cobalt-base alloy. The new alloy is mainly comprised of C, Si, Cr, W and Cu and is of a low carbon, high chromium, high silicon, high tungsten and copper type Ni-base alloy. The said Ni-base alloy has excellent high temperature adhesive wear resistance and intercrystalline corrosion resistance properties, which are superior to that of the stellite No. 6 alloy Co-base alloy. In addition, the hardness, abrasive wear resistance, scratch resistance, corrosion resistance, elevated temperature oxidation resistance, heat resistance fatigue, crack resistance, operational applicability and other properties are equal to that of Stellite No. 6 Co-base alloy. The alloy of this invention can be used as a substitute for Co-base alloy in hard surfacing of high temperature, high pressure valves and valves for nuclear industry as well as other easily worn spare parts.

9 Claims, 1 Drawing Sheet

CO-SUBSTITUTE NI-BASE WEAR RESISTANCE ALLOY FOR HARD SURFACING

BACKGROUND OF THE INVENTION

This invention is related to a kind of alloy material used for hard surfacing, more particularly, this invention is related to a type of alloy material comprised mainly of C, Si, Cr, W and Cu elements and is a type of low C, high Cr, high Si, high W and Cu wear resistant Co-substitute Ni-base alloy for hard surfacing.

Among the existing Co-substitute wear alloys, the Ni-base alloy is mostly used, in which the low boron low carbon group according to the different content of the strengthening elements, Cr, W, Si, can be divided into a high Cr, low Si type (Cr≧20%, Si<4.5%, U.S. Pat. No. 4,515,869) and a low Cr high Si type (Cr<20%, Si≧4.5%, Japanese Patent SHOWA 55-31127) and a high Cr, high Si and low W type (Cr>20%, Si>4.5%, W≦5% U.S. Pat. No. 4,404,049; Japanese Patent SHOWA 57-16495) etc. in the determination of the chemical composition of the existing Co-substitute alloys, the effects of the changes of individual elements on the properties of the alloy are usually investigated, but the effects of the combination of elements as a whole and the changes of their contents are seldom investigated and studied, so that only one or some of the properties of the existing Ni-base alloys can be the same to those of the Co-base alloy.

The microstructures of the above-mentioned Ni-base alloys basically stimulates the structural morphology of the Co-base Stellite No 6 alloy, that is either eutectic (binary or trinary eutectic formed by carbide, boride or silicate and solid solution) or dispersion carbide is added to solid solution strengthened Ni solid solution matrix. With this kind of structural morphology the solid solution and the strengthened eutectic phase will often at elevated temperature and the dispersion carbide can not prevent the matrix from plastic deformation caused by wear at elevated temperature, so that the ideal adhesive wear resistance at elevated temperature could not be developed as in the existing Co-substitute alloys or the original Co-base Stellite No 6 alloy. In addition, because the strengthened eutectic phase formed a continuous network lattice over the solid solution grain boundaries, the ductility, toughness and intercrystalline corrosion resistance of the material decreased.

SUMMARY OF THE INVENTION.

The object of this invention is to develop a Co-free Ni-base alloy that possesses excellent adhesive water resistance at elevated temperature and high intercrystalline corrosion resistance besides having other properties such as hardness, abrasive wear resistance, scratch resistance, corrosion resistance, oxidation resistance at elevated temperature, heat resistance tolerance, crack resistance behaviour and operational adaptability that are the same to that of the Stellite No 6 Co-base alloy, so that it can be used in hard surfacing of high temperature and high pressure valves and valves for nuclear industry or other easily worn spare parts as a substitute for Co-base alloy. In order to assure the fulfillment of the object of this invention, a wear resistance Co free Ni-base alloy for hard surfacing comprising mainly of C, Si, Cr, W and Cu with suitable amount of B added in accordance with the technical requirement is developed.

The features and advantages of this invention are hereunder described in detail with a metallograph (FIG. 1) of the deposit metal of this invention alloy and a table of the properties of Stellite No 6 Co-base alloy and the invented alloy for comparison.

DETAILED DESCRIPTION OF THE INVENTION

Figure 1:
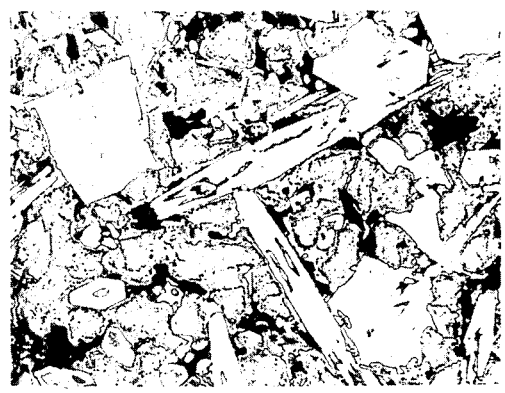

This Co- free Ni-base wear resistance alloy for hard surfacing in this invention is comprised mainly of C, Si, Cr, W and Cu and their contents are as fallows : 0.3-1.5% C, 4.5-8% Si, 20-35% Cr, 5-15% W, 0.5-5% Cu, (wt. %) the rest are Ni and some inevitable impurities.

The Co-free Ni-base alloy in this invention is of a low carbon (C≦1.5%) high chromium (Cr≧20%) high silicon (Si≧4.5%) high tungsten(W≧5%) with certain amount of Cu type of Ni base alloy. Its microstructure is solid solution strengthened Ni- base γ solid solution of moderate hardness with enough quantity of large size polyhedral intermetallic compound of Cr, Ni, W, Si type and big rod shape primary Carbide of $(Cr, W)_7 C_3$ type (FIG. 1).

This type of microstructure possesses excellent resistance to plastic deformation at elevated temperature, thus having the excellent property of adhesive wear resistance at elevated temperature.

This invention was developed by using orthogonal design method and systematically investigated on the combined effects of the combination of different strengthening elements and their simultaneous changes on the overall properties of the alloy, assuring at a rational relationship of the different strengthening elements, from which the range of the chemical compositions of the alloy was determined, therefor the contents of the alloy elements match each other. The orthogonal design assures to obtain the decided microstructures and to optimize the over all properties.

The principle in the determination of the contents of various elements in this wear resistance Co- free Ni-base alloy of this invention is that : if the C content is too low (C<0.3%), the hardness of the alloy will drop and will not form the required big rod shape $M_7C_3$ carbide and if the C content is too high, in excess of 1.5%, the C and Cr,W and other elements will form excess carbides and will not obtain the designed large size polyhedral intermetallic compounds of Cr, Ni, W, Si type. Therefore the hardness phase which only consists of big rod shape carbide substantially decreases the ductility and toughness of the alloy, which can not attain the objective of developing an alloy with excellent adhesive wear resistance at elevated temperature and adequate toughness.

Boron is usually not added to the alloy in this invention, but in order to improve the workability of pulverization, small amount of boron may be added, but should not exceed 1%. In this way, the brittle boride phase will not form in the alloy, hence will not decrease the ductility and toughness of the alloy.

High Cr, high W, high Si (Cr≧20%, W≧5%, Si≧4.5%) will assure part of Cr, W to form $(Cr,W)_7C_3$ carbide and will also assure another part to form intermetallic compound of Cr, Ni,W, Si. If any one of the three elements does not have enough amount, the required microstructures could not be obtained. But the contents exceed the limit, which will cause the alloy to become brittle or decrease the workability of hard surfacing of the alloy. The addition of Cu to the alloy in this invention will increase the adhesive wear resistance capacity of the alloy. But excessive amount will cause the alloy to become brittle, 0.5–5% Cu (wt. %) will be suitable. If the Boron content is 0.5–1% (wt. %) in the alloy, Cu content should be 0.5–2%, in order to assure the elevated temperature properties of the alloy of this invention, Fe content should be controlled to equal to or less than 2% (wt. %).

With the microstructures of the Co-substitute Ni-base wear resistant alloy for hard surfacing of this invention, the hardness of the Ni solid solution may have decreased under elevated temperature, when this intermetallic adhesive wear is taking place, and there is a tendency to plastic deformation, but since the intermetallic compound and the carbides do not soften at elevated temperature, besides their sizes are big enough to prevent the material from developing plastic deformation. Thus the adhesive wear resistance capacity of the alloy of this invention at elevated temperature is very much higher than that of the Co-base Stellite No 6 alloy, therefore the alloy of this invention is specially adapted for the use in hard surfacing seal face of high temperature and high pressure valve. In the microstructures of the alloy of this invention, the brittle eutectic phase distributed in lattice form along the grain boundaries, similar to those existing in the Co-base stellite No 6 alloy does not exist, and the hardness of the solid solution is moderate, thus the alloy of this invention is superior to stellite No 6 alloy in the intercrystalline corrosion resistance and has adequate tongness and ductility, therefore the alloy of this invention is specially suitable for hard surfacing the seal face of stainless steel valve and safety valve that require intercrystalline corrosion resistance. The said alloy of this invention belong to a type of Co-free, low-B, low-Fe, Ni-base alloy, which is also suitable for the use in valves for nuclear industry.

This Co- substitute Ni- base alloy in this invention has the same overall properties as Stellite No 6 alloy (refer to table 1), therefore it can be substituted for Co- base alloy such as Stellite No 6 alloy in a rather wide range.

The explanation to the figure and table attached to this description literature are as follows:

FIG. 1 is the microstructure of the Co-substitute Ni-base wear resistant alloy for hard surfacing of this invention.

Table 1 is a table in which the properties of Ni-base alloy of this invention and Stellite No 6 Co-base alloy are listed for comparison.

Below are description of the production method of the alloy of this invention and actual example of carrying out this invention.

To obtain the said alloy, industrial raw materials can be used in accordance with the composition of this invention and smelted in a H.F. induction furnace, then by using water or nitrogen gas, the molten metal is atomize into alloy powder, which can be used for plasma arc surfacing, or cast into 5 mm diameter welding rod for use in oxy-acetylene flame or TlG surfacing. the rod can also be used for making electrode for manual metall arc surfacing.

The practical chemical compositions of the alloy of invention (wt. %) are listed as follow:

|   | C | Si | Cr | W | B | Cu | Fe | Ni |
|---|---|---|---|---|---|---|---|---|
| 1 | 1.5 | 5.5 | 25 | 6.5 | 0 | 1.0 | <2 | rest |
| 2 | 1.0 | 4.5 | 25 | 12.0 | 0 | 1.5 | <2 | rest |
| 3 | 1.0 | 5.0 | 22 | 5 | 0.5 | 1.0 | <2 | rest |
| 4 | 1.0 | 6.0 | 30 | 7.0 | 0 | 3.0 | <2 | rest |
| 5 | 0.6 | 5.0 | 20 | 7.0 | 0.8 | 1.0 | <2 | rest |
| 6 | 0.3 | 7.0 | 20 | 9.0 | 0 | 4.0 | <2 | rest |

The elevated temperature adhesive wear-resistant tests at 600° C. for the said alloy were made in a intermetallic adhesive weartesting-machine, with a pressure of 4.7 MPa (47 Kgf/cm$^2$) and a rotating rate of 60 rpm. After 1800 revolutions, the said alloy was weared about 0.03–0.01 g. and this quantity was about 1/5 of that of Stellite No 6 alloy under the same experiment condition. Therefore, the adhesive wear-resistant capacity of the alloy of this invention at elevated temperature was about five times better than that of Stellite No 6 alloy. Intercrystalline corrosion resistance experiment was also made with the D method (cupper sulfate method) and the intercrystalline corrosive tendency of the alloy tested was investigated under microscope. The experiment results showed that the Co-substitute Ni-base wear-resistant alloy was obviously superior to Stellite No 6 alloy, and the former had no intercrystalline corrosion tendency. Other properties of the said alloy, such as room temperature and elevated temperature hardness, wear-resistant and corrosion resistant capacity, etc, were similar to that of Stellite No 6 alloy.

What is claimed is:

1. A Ni-base wear resistant alloy for hard surfacing consisting essentially of C, Si, Cr, W, and Cu in amounts based on the following wt. % : 0.3–1.5 C, 4.5–8 Si, 20–35 Cr, greater than 5 and up to 15 W, 0.5–5 Cu, the balance being Ni and impurities; the microstructure of the composition being a Ni-base $\gamma$ solid solution of moderate hardness with large size polyhedral intermetallic compounds of chromium, nickel, tungsten and silicon and rod-shaped chromium and tungsten carbides.

2. A hard surfacing alloy as claimed in claim 1, wherein the content of Fe is less than 2%, and the content of B, being equal to or less than 1%.

3. A hard surfacing alloy as claimed in claim 2, wherein the content of Cu is 0.5–2%, and the content of B is 0.5–1.0%. (wt. %)

4. A hard surfacing alloy as claimed in claim 2, wherein, the ingredients of the alloy are as follows (wt. %):
1.5% C, 5.5% Si, 25% Cr, 6.5% W, 1.0% Cu, Fe less than 2%, the balance being Ni and impurities.

5. A hard surfacing alloy as claimed in claim 2, wherein the ingredients of the alloy are as follows (wt. %): 1.0% C, 4.5% Si, 25% Cr, 12% W, 1.5 % Cu, Fe less than 2%, the balance being Ni and impurities.

6. A hard surfacing alloy as claimed in claim 2, wherein the ingredients of the alloy are as follows (wt. %): 1.0% C, 6.0% Si, 30% Cr, 7% W, 3% Cu, Fe less than 2%, the balance being Ni and impurities.

7. A hard surfacing alloy as claimed in claim 2, wherein teh ingredients of the alloy are as follows (wt. %): 0.3% C, 7% Si, 20% Cr, 9% W, 4% Cu, Fe less than 2%, the balance being Ni and impurities.

8. A hard surfacing alloy as claimed in claim 3, wherein the ingredients of the alloy are as follows (wt. %): 1% C, 5% Si, 22% Cr, 5% Cr, 5% W, 0.5% B, 1% Cu, Fe less than 2%, the balance being Ni and impurities.

9. A hard surfacing alloy as claimed in claim 3, wherein, the ingredients of the alloy are as follows (wt. %): 0.6% C, 5% Si, 20% Cr, 7% W, 0.8% B, 1% Cu, Fe less than 2%, the balance being Ni and impurities.

* * * * *

UNITED STATES PATENT AND TRADEMARK OFFICE
CERTIFICATE OF CORRECTION

PATENT NO. : 4,911,768

DATED : March 27, 1990

INVENTOR(S) : DONG et al.

It is certified that error appears in the above-identified patent and that said Letters Patent is hereby corrected as shown below:

Column 1, line 37, "will often at" should read -- will soften at --;

line 51, "adhesive water" should read -- adhesive wear --.

Column 4, line 56, "wherein teh" should read -- wherein the --;

line 61, "22% Cr, 5% Cr, 5% W" should read -- 22% Cr, 5% W --.

Signed and Sealed this

Twenty-fourth Day of September, 1991

Attest:

HARRY F. MANBECK, JR.

Attesting Officer      Commissioner of Patents and Trademarks